No. 856,789. PATENTED JUNE 11, 1907.
C. E. LITTLEFIELD.
SEED PLANTER AND FERTILIZER DISTRIBUTER.
APPLICATION FILED NOV. 5, 1906.

3 SHEETS—SHEET 1.

WITNESSES
Edward Thorpe

INVENTOR
Charles E. Littlefield
BY
Munn & Co.
ATTORNEYS

THE NORRIS PETERS CO., WASHINGTON, D. C.

No. 856,789. PATENTED JUNE 11, 1907.
C. E. LITTLEFIELD.
SEED PLANTER AND FERTILIZER DISTRIBUTER.
APPLICATION FILED NOV. 5, 1906.

3 SHEETS—SHEET 2.

WITNESSES
Edward Thorpe

INVENTOR
Charles E. Littlefield
BY
Munn & Co
ATTORNEYS

No. 856,789. PATENTED JUNE 11, 1907.
C. E. LITTLEFIELD.
SEED PLANTER AND FERTILIZER DISTRIBUTER.
APPLICATION FILED NOV. 5, 1906.

3 SHEETS—SHEET 3.

WITNESSES
Edward Thorpe

INVENTOR
Charles E. Littlefield
BY Munn & Co
ATTORNEYS

UNITED STATES PATENT OFFICE.

CHARLES ERASTUS LITTLEFIELD, OF JESUP, GEORGIA.

SEED-PLANTER AND FERTILIZER-DISTRIBUTER.

No. 856,789.  Specification of Letters Patent.  Patented June 11, 1907.

Application filed November 5, 1906. Serial No. 342,075.

*To all whom it may concern:*

Be it known that I, CHARLES ERASTUS LITTLEFIELD, a citizen of the United States, and a resident of Jesup, in the county of Wayne and State of Georgia, have invented a new and Improved Seed-Planter and Fertilizer-Distributer, of which the following is a full, clear, and exact description.

The purpose of the invention is to provide a combined planter and fertilizer distributer which can be used for continuous sowing, drilling, or for planting seed at desired distances apart, and which will be simple, durable, light of draft and economic in construction, and whereby also two kinds of seed can be planted at the same time from the same machine at desired intervals apart.

A further purpose of the invention is to provide a machine of the character described which will open a furrow, deposit the fertilizing material therein behind the opening plow, thereby allowing the dirt or soil that naturally falls behind any plow, to fall upon the fertilizer before the seed is dropped thereon by a further operation of the machine, thus causing the fertilizer to be distributed deeper than said seed, which materially promotes germination.

Another purpose of the invention is to provide means for initially covering the seed immediately after planting, and for subsequently closing the furrow, and finally rolling down the loose earth thrown into the furrow in filling it.

The invention consists in the novel construction and combination of the several parts, as will be hereinafter fully set forth and pointed out in the claims.

Reference is to be had to the accompanying drawings forming a part of this specification, in which similar characters of reference indicate corresponding parts in all the figures.

Figure 1:
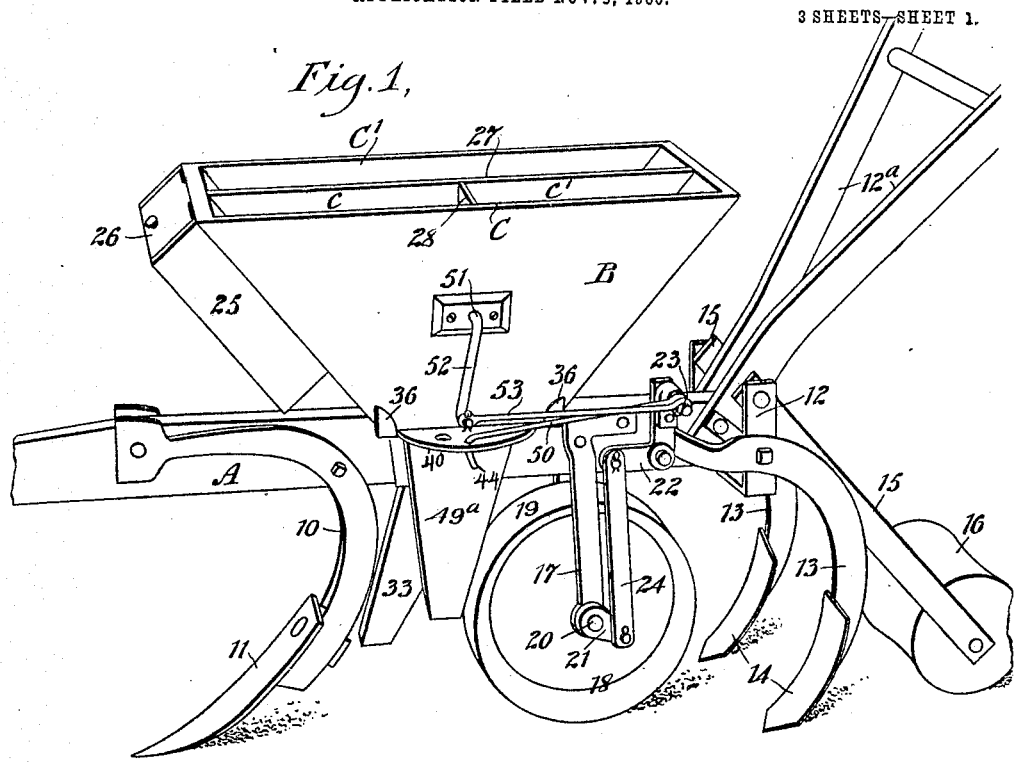
Figure 2:
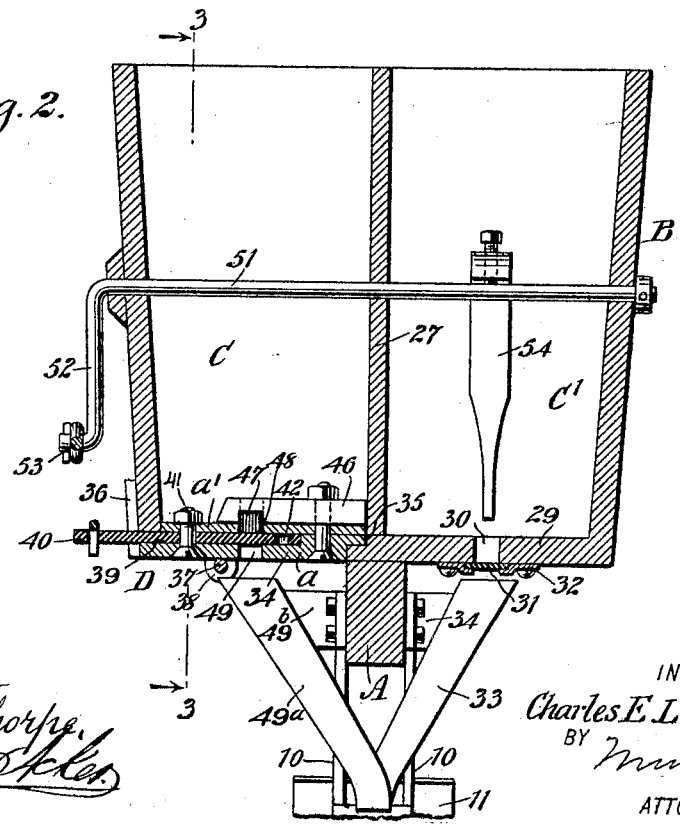
Figure 3:
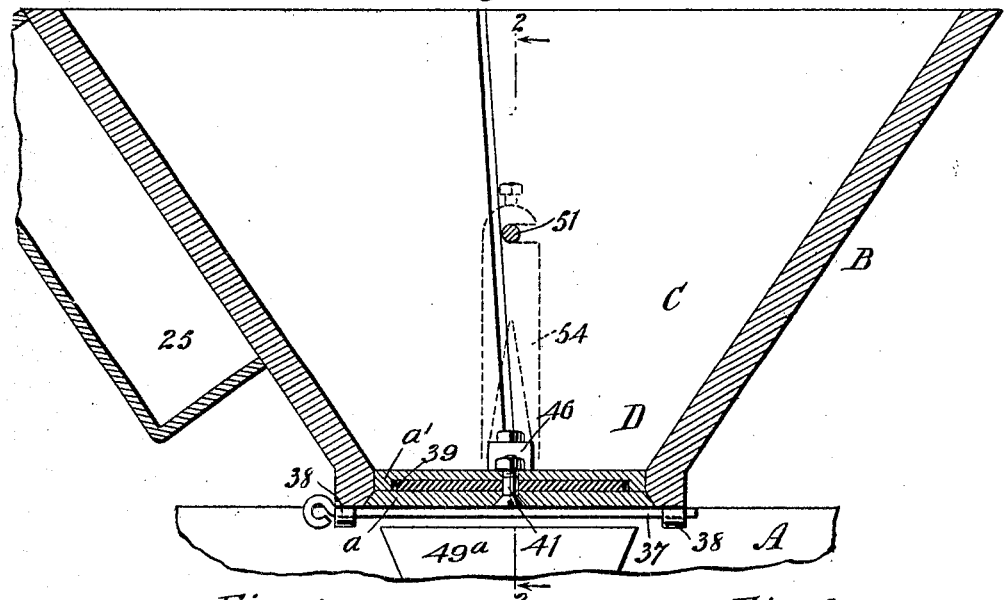
Figures 4, 5:
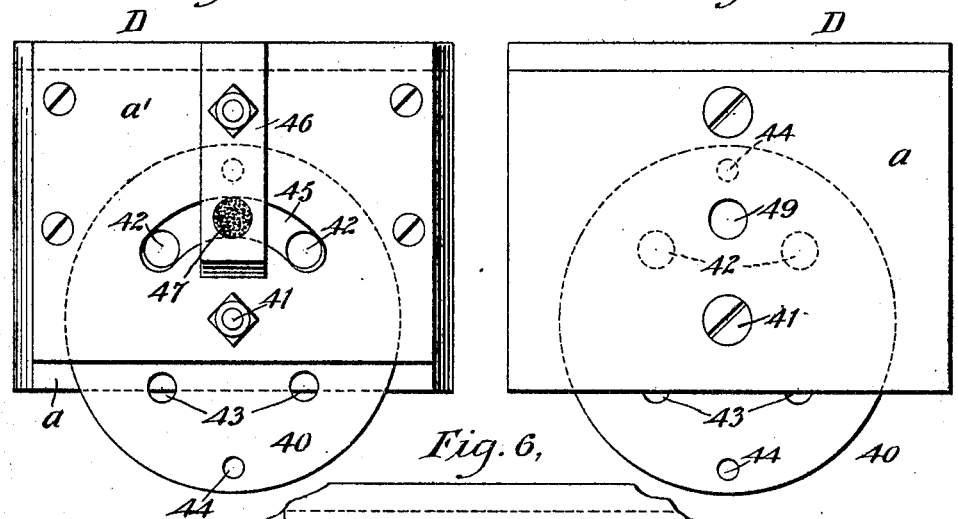
Figure 6:
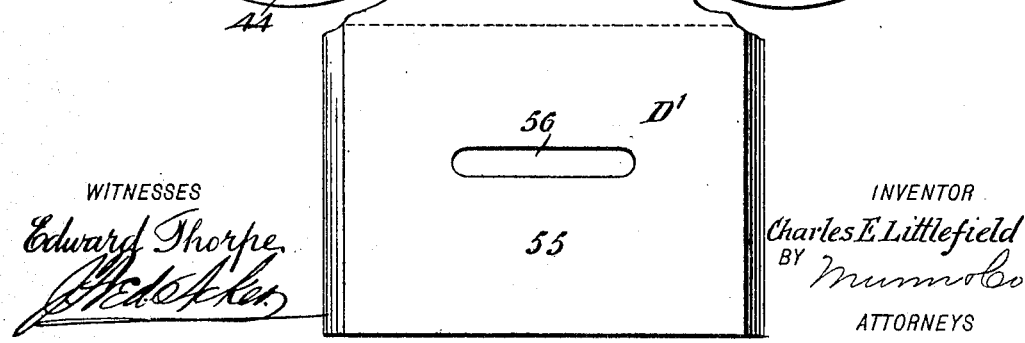
Figure 7:
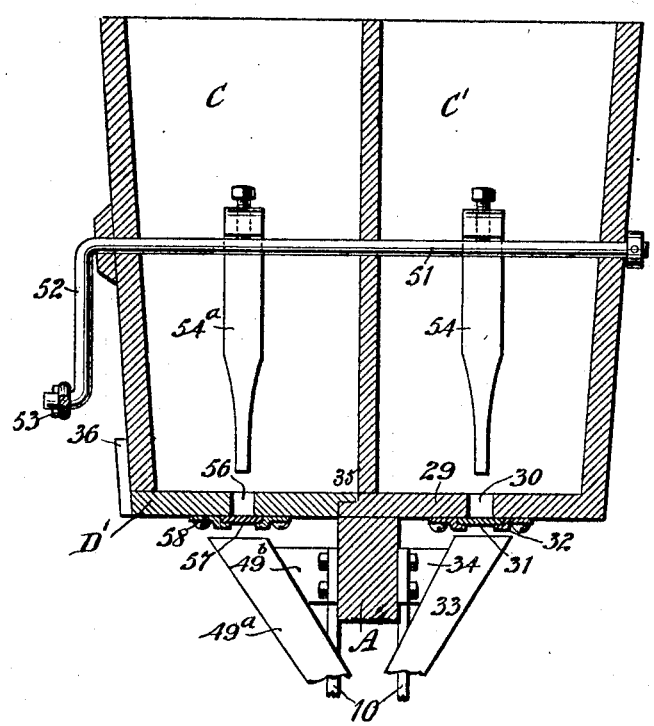
Figure 8:
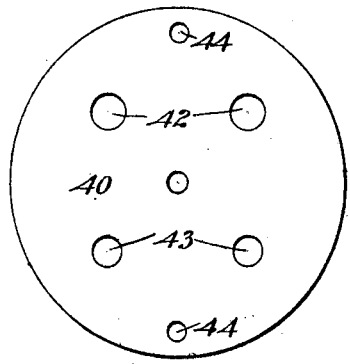

Figure 1 is a perspective view of the machine the beam and handles being broken away; Fig. 2 is an enlarged vertical section taken practically on the line 2—2 of Fig. 3; Fig. 3 is a vertical section taken at right angles to that shown in Fig. 2, and practically on the line 3—3 of Fig. 2; Fig. 4 is a plan view of the bottom of the seed compartment of the hopper; Fig. 5 is a bottom plan view of the part shown in Fig. 4; Fig. 6 is a plan view of the fertilizing compartment of the hopper; Fig. 7 is a vertical section through the hopper, arranged for continuous sowing or distribution in each compartment, a section through the beam, and a rear elevation of the spouts for conducting material from said hopper; and Fig. 8 is a detail plan view of the seed-distributing disk.

A represents a plow beam made of any suitable material, and said beam between its center and clevis end is provided with a downwardly and forwardly curved standard 10 which straddles the said beam, and said standard carries at its lower end an opening plow 11 of any suitable construction capable of adjustment in the said standard.

At the rear of the beam A an upwardly-extending substantially U-shaped bracket 12 is secured, the side members whereof extend beyond the sides of the beam, and rear shanks 13 are attached to the upright side members of said bracket 12. Each of the rear shanks 13, which are downwardly and forwardly curved, carry the covering blades 14. The shanks 13 may be so adjusted as to cause said blades 14 to throw more or less earth into the furrow made by the opening plow 11.

Arms 15 are pivotally attached to the upper portions of the side members of the bracket 12, and said arms extend downward and rearward and have a roller 16 journaled between them, the peripheral surface of which roller is more or less concave, said roller being adapted to press the loose earth thrown into the furrow closely upon the deposited seed.

Between the forward and the rear standards hangers 17 extend downward from the sides of the beam A, and an initial covering wheel 18, provided with a peripheral groove 19 is mounted to turn in the said hangers 17 by means of a suitable shaft 20 to which the wheel is attached. The shaft 20 extends out beyond one of the hangers 17 and is provided at its projecting end with an attached crank arm 21; and to the rear of the hangers 17 an elbow lever 22 is fulcrumed at the junction of its members on the same side of the beam A at which the crank arm 21 is located. The vertical member of the said elbow lever 22 is provided with an outwardly projecting pin extension 23, and the horizontal member of the said elbow lever 22 is connected with the crank arm 21 by means of a link 24. The members of the elbow lever 22 are of greater length than the crank arm 21, so that as the wheel 18 revolves and imparts rotary motion to its connected crank 21, the elbow lever 22 will be rocked upon its fulcrum.

A hopper B is secured in any suitable or approved manner upon the beam A between the hangers 17 and the forward plow standard 10, and the side portions of said hopper extend beyond the sides of the beam A as illustrated in Figs. 2 and 7. The hopper is provided preferably at its forward end with a locker 25 having a suitable cover 26, in which locker the interchangeable parts of the machine are to be stored and carried.

The hopper B is provided with a partition 27, extending through from front to rear, dividing the said hopper into two main compartments C and C'. The compartment C is adapted to receive the seed to be planted and the compartment C' is intended to carry the fertilizing material to be distributed. If two kinds of seed are to be planted, the seed compartment C is divided by a transverse partition 28 which is removable, whereby the said seed compartment C is sub-divided into compartments c and c', said partition 28 being at the center of the main compartment C.

The bottom 29 of the fertilizer compartment C' is provided at its central portion with a slot 30 for the escape of the fertilizing material; and the said slot 30 is closed, or partially closed, by means of a gate or slide 31, mounted to slide in ways 32 secured to the under face of the said bottom 29, as shown in Figs. 2 and 7. This gate is readily operated from the rear of the device, which rear portion of the device is provided with the customary handles 12$^a$.

A chute 33 is secured for example to the left-hand side of the beam A by means of suitable extensions 34 from its upper portion, and the top of the said chute 33 sustains such relation to the opening 30 in the compartment C' as to receive the material passing therefrom through said slot. Said chute 33 is carried downward and inward beneath the beam, as is shown in Figs. 1 and 2, to a point immediately to the rear of the opening plow 11, so that as the furrow is opened the fertilizing material will be deposited therein and will be covered by the falling earth following the said furrow opener.

In the bottom portion of the seed compartment C a shoulder 35 is formed adjacent to the partition 27 as is shown in Figs. 2 and 7, to receive the rabbeted edge of a bottom D. This bottom is removable, and when the seed is to be dropped at intervals, either one or two varieties of seed,—the bottom is constructed as is shown in Figs. 2, 3, 4 and 5, wherein the bottom D consists of two sections or parts, a lower section $a$ and an upper section $a'$, the two sections being connected by screws or bolts or their equivalents. The lower section $a$ is usually provided with check plates 36, adapted to engage with the outer face of the hopper B, as is shown in Fig. 1; but said bottom D is primarily held in place by a rod 37, passed through eyes 38 secured to the bottom portion of the hopper as is illustrated in Fig. 3. A segmental recess 39 is made in the upper face of the lower section or member $a$ of said bottom D, which recess extends through the outer edge of the bottom and receives a seed-dropping disk 40, journaled at its center between the two seed parts $a$ and $a'$, by a pin or bolt 41, so that a portion of the disk extends beyond the outer face of the hopper as is shown in Figs. 1, 2, 4 and 5. Said disk 40 is provided with opposing pairs of seed-receiving apertures or pockets 42 and 43, either of which may be brought into service according to the character of the seed to be planted, since one set of pockets is larger than the other; and adjacent to the margin of said seed-dropping disk 40 a single aperture 44 is produced opposite the center of the space between the respective pairs of seed-receiving apertures or pockets 42 and 43, as is best shown in Fig. 8. The apertures 44 are for a purpose to be hereinafter described.

An arcuate slot 45 is made in the upper member $a'$ of the bottom D; and at the central portion of said slot a drop opening 49 is made in the lower member $a$ of said bottom D, through which the seed escapes from said compartment C. Over this escape or drop opening 49 a brush 47 is permanently held by a suitable support 46 secured to the said upper member of the bottom D as is illustrated in Figs. 2 and 4, whereby to wipe off any excess of seed from the openings 42 and 43 in said seed-dropping disk 40. The seed from the drop opening 49 is received by the spout or chute 49$^a$, secured to the beam A by a bracket 49$^b$ at the opposite side to that where the fertilizer chute 33 is secured, as is shown in Figs. 2 and 7. The chute 49$^a$ extends downward, terminating at the rear of the chute 33 and in front of the initial covering wheel 18 as is shown in Fig. 1.

The seed drop disk 40 is actuated from an elbow lever 22 by means of a connecting rod 50, attached to the pin 23 projecting from said lever and having one end passed through the outer marginal aperture 44 of the disk as is shown in Fig. 1; and since the members of the elbow lever 22 are longer than the crank arm 21, as said crank arm is revolved the lever 22 is rocked upon its fulcrum and a reciprocating rocking motion is imparted to the seed drop disk, which will bring one or the other of the openings 42 or 43 alternately over the drop opening 49 in the bottom D, and if a partition 28 is used in connection with the seed compartment C, each pocket in its turn will cause seed of a different character to be alternately dropped;

if but one kind of seed is to be planted, each pocket will carry the same character of seed, the partition 28 being then dispensed with. A shaft 51 is passed through both compartments of the hopper, being provided at one end with a crank arm 52, which is connected by a link 53 with the projecting pin 23 from the elbow lever 22, whereby to rock the shaft and also the agitator arm 54 secured upon said shaft within the fertilizer compartment C' over its discharge slot 30.

When the implement is used for continuous sowing or distribution of both seed and fertilizing material, the bottom D is removed and the bottom D' is substituted, as is shown in Fig. 7, and said substituted bottom is provided with a discharge slot 56, similar to the slot 30 in the bottom of the fertilizing compartment C'. Said slot 56 may be closed or may be opened to a greater or lesser extent by means of a gate 57 corresponding to the gate 31 and mounted for movement in slideways 58, as is also shown in Fig. 7; and when the substituted bottom D' is employed a second agitator arm 54ª is secured upon the shaft 51 within the seed compartment C.

Having thus described my invention, I claim as new, and desire to secure by Letters Patent,—

1. In an agricultural implement, a beam, a furrow opener carried by said beam, a hopper secured to the beam to the rear of the furrow opener, said hopper being provided with a partition dividing it into compartments, one for seed and the other for fertilizing material, each compartment being provided with an outlet for its bottom, an independent chute for each compartment of the hopper, said chutes being located to the rear of the furrow opener, one in advance of the other, a covering wheel located to the rear of the said chutes, means for regulating the discharge of material from one of the compartments by the rotation of the said covering wheel, covering shares carried by the beam to the rear of the covering wheel, and a roller likewise carried by the beam to the rear of the covering shares.

2. In an agricultural implement, a beam, a furrow opener carried by the beam, a hopper supported on said beam to the rear of the furrow opener, a partition dividing the hopper into a seed compartment and a compartment for fertilizing material, a removable bottom for the seed compartment, having an outlet therein, a slot above said outlet and a seed drop disk mounted to oscillate relatively to the said slot and the outlet, a covering wheel carried by the said beam and means for operating the said seed drop disk by the rotation of the said covering wheel, a chute located below the outlet for each compartment of the hopper, extending down between the furrow opener and the said covering wheel, a brush located over the slot in the bottom of the seed compartment and the outlet opening therein, a shaft mounted to oscillate in the said hopper, an agitator carried by said shaft, and means for revolving said shaft by the rotation of the said covering wheel.

3. In a combined planter and fertilizer distributer, a beam, a furrow opener carried by said beam, a covering wheel likewise carried by the beam to the rear of the furrow opener, covering blades supported from the beam to the rear of the covering wheel, a roller likewise supported from the beam to the rear of the covering blades, a hopper located on the said beam between the furrow opener and the covering wheel, said hopper being divided into a compartment for fertilizing material and a compartment for seed, each compartment being provided with an outlet opening in its bottom, a seed drop disk having pockets therein and operating relatively to the outlet in the bottom of the seed compartment, and chutes extending down from said hopper, one from the outlet of each compartment therein, the lower terminals of the chutes being one in advance of the other and both chutes being located between the furrow opener and the covering wheel.

4. In a combined seed planter and fertilizer distributer, the combination with a beam, a furrow opener carried by said beam, a covering wheel to the rear of said furrow opener, hangers therefor, a crank shaft secured to the axle of said covering wheel, an elbow lever fulcrumed upon said beam, and a link connection between the crank shaft and the elbow lever, of a hopper located between the furrow opener and the covering wheel, a partition for said hopper dividing it into two compartments, one for seed and the other for fertilizing material, each compartment having an opening in its bottom, a disk mounted to oscillate at the bottom portion of the seed compartment, which disk is provided with pockets adapted to register with the outlet opening in said compartment, and a link connection between the elbow lever and the disk.

5. In a combined seed planter and fertilizer distributer, the combination with a beam, a furrow opener carried by the beam, a covering wheel to the rear of the furrow opener, hangers therefor, a crank shaft secured to the axle of said covering wheel, an elbow lever fulcrumed upon said beam, and a link connection between the crank shaft and the elbow lever, of a hopper located between the furrow opener and the covering wheel, a partition for the hopper dividing it into two compartments, one for seed and the other for fertilizer material, each compartment having an opening in its bottom, a disk mounted to oscillate at the bottom portion of the seed compartment, which disk is provided with pockets adapted to register with the outlet opening in said compartment, a link connection between the said elbow lever and the said disk, a brush located over the said disk and the outlet opening in the bottom of the seed compartment, a shaft mounted to oscillate in said hopper, an agitator carried by said shaft, and means for operating the said agitator shaft from the said elbow lever as described.

6. In a planter and fertilizer distributer, the combination of a beam, a supporting wheel for the beam and having a crank arm at one end of its shaft, a hopper mounted on the beam, a seed drop disk mounted in the bottom of the hopper, an elbow lever mounted on the beam, a rod connecting the seed drop disk with one member of the elbow lever, and a link connecting the other member of the elbow lever with the crank of the said wheel.

7. In a planter and fertilizer distributer the combination of a beam, a supporting wheel for the beam, a hopper having compartments and mounted upon the beam, a seed dropping device in the bottom of one compartment of the hopper, an agitator in the other compartment of said hopper, an elbow lever mounted on the frame, means for rocking the elbow lever from the supporting wheel, and means for operating the said dropping device and agitator from the said elbow lever.

8. In a planter and fertilizer distributer, the combination of a hopper having an open lower end, a removable bottom for the lower end of the hopper, said bottom being formed of an upper and lower section, the lower section having a segmental recess in its upper face and the upper section provided with a curved slot, means for securing the bottom in position and an oscillating seed drop disk pivoted in the recess of the lower section of the bottom of the hopper and provided with a pair of seed receiving apertures.

9. In a planter and fertilizer distributer, the combination of a hopper having an open lower end and provided with a shoulder at one side of the lower end, and with eyes projecting below the said lower end, a removable bottom having one edge rabbeted to engage the shoulder of the hopper, and a rod passing through the said eyes below the bottom.

In testimony whereof I have signed my name to this specification in the presence of two subscribing witnesses.

CHARLES ERASTUS LITTLEFIELD.

Witnesses:
  THOMAS A. FLOYD,
  G. E. PARKER.